Jan. 1, 1935.
C. W. RUSSELL
1,986,220
SPRINKLING DEVICE
Filed Sept. 24, 1931
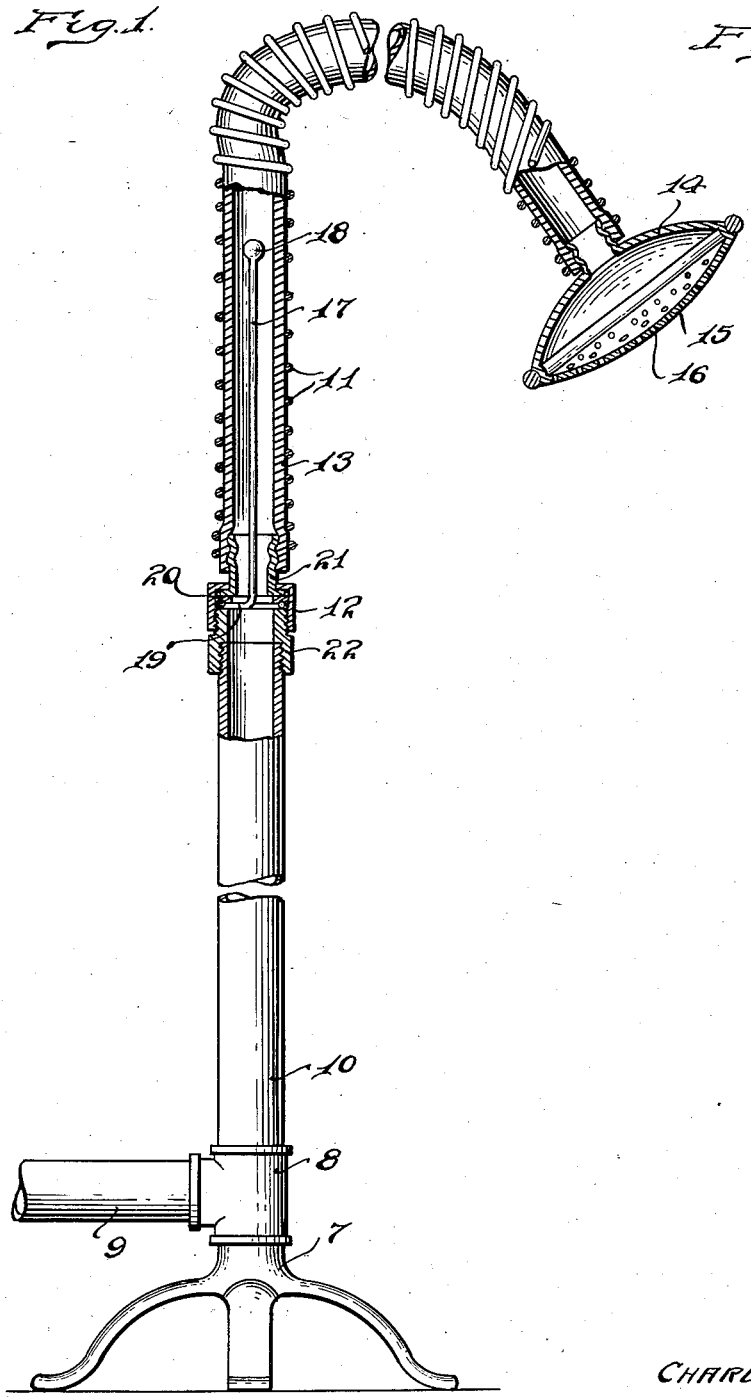
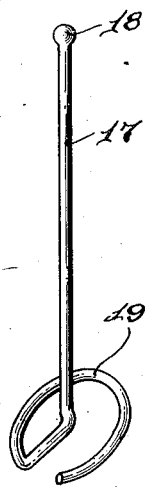
INVENTOR.
CHARLES W. RUSSELL.
BY
ATTORNEY.

Patented Jan. 1, 1935

1,986,220

UNITED STATES PATENT OFFICE 1,986,220

SPRINKLING DEVICE

Charles W. Russell, Detroit, Mich.

Application September 24, 1931, Serial No. 564,860

1 Claim. (Cl. 299—65)

My invention relates to a new and useful improvement in a sprinkling device adapted for use in sprinkling lawns, gardens and the like.

It is an object of the invention to provide a sprinkling device wherein the reaction of the water issuing under pressure from the device may be utilized for swinging the outlet nozzle so that a delivery of the water over a wide area may be effected.

Another object of the invention is the provision of a sprinkling device having an outlet nozzle mounted on the end of a flexible conduit so arranged that the water flowing therethrough will serve to oscillate the nozzle to spread the spray issuing therefrom.

Another object of the invention is the provision in a device of the class described of a flexible conduit carrying an outlet nozzle and so arranged that any undue flexing of the conduit will be prevented.

Other objects will appear hereinafter.

The invention consists in the combination and arrangement of parts hereinafter described and claimed.

The invention will be best understood from a reference to the accompanying drawing which forms a part of this specification and in which, Fig. 1 is a side elevational view of the invention with a part broken away and a part shown in section, Fig. 2 is a perspective view of a stiffener used in the invention.

In the invention I provide a base 7, mounted on which is a T 8, connected to which is the water supply pipe or hose 9. An upwardly projecting pipe 10 is connected to the T 8 and serves as a conduit and also as a standard to support and conduct water to the upper structure.

A fitting 21 is attached to a fitting 22 by means of the coupling sleeve 12, the fitting 22 being threaded on the upper end of the pipe 10. A flexible conduit 13 is attached at one end to the end of the fitting 21. The opposite end of the flexible conduit 13 carries a globe shaped outlet nozzle having the back portion 14 and the front portion 15 which is provided with a plurality of outlet openings 16. Embracing the conduit 13 is a coil spring 11 which serves as a reenforcement therefor and prevents too great a movement of the same when the water is issuing from the nozzle. A stiffener 17, formed from a stiff wire or the like, is provided at one end with an engagement head 18 and at its opposite end with a coil or ring 19 which is clamped against the washer 20 by the coupling sleeve 12.

In use when the water under pressure issues from the outlet nozzle the reaction of the water will cause this nozzle to oscillate or wave, thus causing the distribution of the spray over a wide area. The spring 11 and the stiffener 17 prevent the conduit 13 from bending an excessive amount due to the weight of the outlet nozzle. The engagement head will engage the inner surface of the conduit 13 and serve to determine the position of bend of this conduit 13. The head 18 is rounded so as not to cut or excessively wear the conduit 13.

It is believed obvious that the device is of economical manufacture and that it is durable in use. The device may also be made quite light so that it is easily moved about.

While I have illustrated and described the preferred form of construction I do not wish to limit myself to the precise details of construction shown but desire to avail myself of such variations and modifications as may come within the scope of the appended claim.

Having thus described my invention what I claim as new and desire to secure by Letters Patent is:

A sprinkling device of the class described comprising: a flexible conduit; a flexible resilient reinforcing member embracing said conduit and extending throughout the length thereof; a nozzle mounted on one end of said conduit; a flexible resilient reinforcing member projecting inwardly of said conduit a portion of its length from the opposite end; and an engagement head on the inner end of said second-mentioned reinforcement member normally non-engaging with the inner surface of said conduit and engageable therewith upon the bending of said conduit at said portion.

CHARLES W. RUSSELL.